United States Patent
Abe et al.

(10) Patent No.: US 9,395,666 B2
(45) Date of Patent: Jul. 19, 2016

(54) MEMBER FOR ELECTROPHOTOGRAPHY AND HEAT FIXING DEVICE

(71) Applicant: CANON KABUSHIKI KAISHA, Tokyo (JP)

(72) Inventors: Katsuya Abe, Tokyo (JP); Katsuhisa Matsunaka, Inagi (JP); Yasuhiro Miyahara, Tokyo (JP); Naoki Akiyama, Toride (JP); Hiroto Sugimoto, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/603,667

(22) Filed: Jan. 23, 2015

(65) Prior Publication Data
US 2015/0212461 A1    Jul. 30, 2015

(30) Foreign Application Priority Data

Jan. 27, 2014    (JP) .................. 2014-012584

(51) Int. Cl.
| | |
|---|---|
| *G03G 15/20* | (2006.01) |
| *B32B 27/28* | (2006.01) |
| *B32B 7/12* | (2006.01) |
| *B32B 25/20* | (2006.01) |

(52) U.S. Cl.
CPC .............. *G03G 15/206* (2013.01); *B32B 7/12* (2013.01); *B32B 25/20* (2013.01); *B32B 27/28* (2013.01); *G03G 15/2057* (2013.01); *B32B 2250/03* (2013.01); *G03G 15/2021* (2013.01); *G03G 2215/2009* (2013.01); *G03G 2215/2016* (2013.01); *G03G 2215/2051* (2013.01); *G03G 2215/2054* (2013.01); *Y10T 428/256* (2015.01); *Y10T 428/269* (2015.01); *Y10T 428/31544* (2015.04); *Y10T 428/31663* (2015.04)

(58) Field of Classification Search
CPC .............. G03G 2215/2048; G03G 2215/2051; G03G 2215/2093; G03G 2215/2096
See application file for complete search history.

(56) References Cited

U.S. PATENT DOCUMENTS

| | | | |
|---|---|---|---|
| 5,420,679 A | * | 5/1995 | Goto .................... G03G 15/206 219/216 |
| 7,725,068 B2 | | 5/2010 | Matsunaka et al. |

(Continued)

FOREIGN PATENT DOCUMENTS

| | | |
|---|---|---|
| EP | 1 089 139 A1 | 4/2001 |
| JP | 04353563 A * | 12/1992 |

(Continued)

OTHER PUBLICATIONS

04353563JPA.tran Translated, Watanabe, JP, Dec. 1992.*

(Continued)

*Primary Examiner* — Clayton E Laballe
*Assistant Examiner* — Victor Verbitsky
(74) *Attorney, Agent, or Firm* — Fitzpatrick, Cella, Harper & Scinto

(57) ABSTRACT

Provided is a member for electrophotography. The member for electrophotography includes: a substrate; an elastic layer containing a cured silicone rubber having a methyl group bonded to a silicon atom; and a fluorine resin release layer bonded to a surface of the elastic layer by an addition-curing-type silicone rubber adhesive. The elastic layer contains a titanium oxide particle having an anatase-type crystal structure.

10 Claims, 4 Drawing Sheets

(56) References Cited

U.S. PATENT DOCUMENTS

| | | |
|---|---|---|
| 7,991,341 B2 | 8/2011 | Matsunaka et al. |
| 2008/0199233 A1 | 8/2008 | Matsunaka et al. |
| 2009/0110453 A1 | 4/2009 | Kuntz et al. |
| 2013/0004202 A1* | 1/2013 | Ishida ............... G03G 15/0818 399/111 |
| 2014/0133892 A1 | 5/2014 | Miura et al. |
| 2014/0248071 A1 | 9/2014 | Matsunaka et al. |
| 2014/0255067 A1 | 9/2014 | Matsunaka et al. |
| 2015/0098739 A1 | 4/2015 | Abe et al. |

FOREIGN PATENT DOCUMENTS

| | | | |
|---|---|---|---|
| JP | 2002-284385 A | | 10/2002 |
| JP | 2005-084294 A | | 3/2005 |
| JP | 2008-176300 A | | 7/2008 |
| JP | 2010230746 A | * | 10/2010 |

OTHER PUBLICATIONS

JP_2010230746_A_T Machine translation; Iwashita, JP, Oct. 2010.*

Tomonori Nakamura, "Coating Material Using Photocatalyst Titanium Oxide," 14 TECHNO-COSMOS 1-6 (Feb. 2001).

Extended European Search Report in European Application No. 15152451.9 (dated Jun. 3, 2015).

Non-final Office Action in U.S. Appl. No. 14/568,933 (Jun. 23, 2015).

Kunio Ito, "Special Topic: Environmental Deterioration of Rubber Materials and Countermeasures Environmental Deterioration of Rubber Materials and Countermeasures," 58(12) Nippon Gomu Kyokaishi (the Journal of the Society of Rubber Science and Technology, Japan) 832-841 (Apr. 1985).

* cited by examiner

MEMBER FOR ELECTROPHOTOGRAPHY AND HEAT FIXING DEVICE

BACKGROUND OF THE INVENTION

1. Field of the Invention

The present invention relates to a member for electrophotography such as a fixing member or pressurizing member to be used in a heat fixing device for an electrophotographic apparatus such as a copying machine or a printer.

2. Description of the Related Art

In an electrophotographic apparatus, a heating device including a heating member and a pressurizing member arranged so as to face the heating member has been used as a heating device for fixing an unfixed toner image formed on a recording material onto the recording material.

In a heat fixing device to be used in an electrophotographic system, a pair of heated rotating members as members for electrophotography like a roller and a roller, a film and a roller, or a belt and a roller have been generally brought into press contact with each other. Then, a recording medium holding an image formed with unfixed toner is introduced into a press-contacting site formed between the rotating members and heated. Thus, the toner is melted and hence the image is fixed onto the recording medium.

The members for electrophotography for the heat fixing device include a fixing member and a pressurizing member. Herein, a member that comes into contact with the unfixed toner image held on the recording medium to heat the unfixed toner is referred to as "fixing member". The fixing members are classified into, for example, a fixing roller, a fixing film, and a fixing belt depending on their forms. Meanwhile, a member that is arranged so as to face the fixing member and forms a fixing nip together with the fixing member is referred to as "pressurizing member". The pressurizing members are classified into, for example, a pressurizing roller, a pressurizing film, and a pressurizing belt depending on their forms.

Incidentally, a problem in the case where an attempt is made to cause the heat fixing device to correspond to recording materials (such as paper) of various sizes is an increase in temperature of the region of a member for electrophotography with which a small-size recording material (such as A4 size paper) does not come into contact. Such region is specifically, for example, an end region in the width direction of the fixing member.

That is, when paper whose width in a longitudinal direction is relatively small (hereinafter sometimes referred to as "small-size paper") as compared to paper of the largest size onto which an image can be fixed by the heat fixing device (hereinafter sometimes referred to as "full-size paper") is continuously passed through the fixing nip like FIG. 6, unlike a region where the small-size paper passes (longitudinal direction width W1), the surface of a member for electrophotography in a region where the small-size paper does not pass (longitudinal direction width W2) is not deprived of heat by the small-size paper.

As described above, in the region in the member for electrophotography with which the small-size paper does not come into contact (the region is hereinafter sometimes referred to as "non-paper passing portion"), heat from the fixing member is not stolen by a recording material or toner on the recording material, and hence the temperature of the non-paper passing portion of the member for electrophotography increases. The phenomenon is hereinafter sometimes referred to as "non-paper passing portion temperature increase."

Such phenomenon is more likely to occur as the speed at which a printer outputs an image (process speed) increases. This is because of the following reason. The time period for which a recording material passes the nip shortens in association with the increase in image output speed, and hence sufficient heat needs to be transferred to a toner image within an additionally short time period. To this end, the temperature of the fixing member needs to be additionally increased.

The member for electrophotography to be used in such heat fixing device generally has a construction obtained by forming an elastic layer containing a silicone rubber cured product on a substrate formed of, for example, a metal or a heat-resistant resin, and bonding a fluorine resin tube onto the layer through a silicone rubber adhesive (Japanese Patent Application Laid-Open No. 2008-176300).

In addition, studies made by the inventors of the present invention have found the following new problem. When a heat fixing device using a member for electrophotography having the construction is operated over a long time period, the hardness of the non-paper passing portion of the member for electrophotography increases, and hence a difference in hardness between the non-paper passing portion and a portion except the non-paper passing portion enlarges.

When a toner image formed on full-size paper is fixed by using the member for electrophotography in which a large hardness difference has occurred between the non-paper passing portion and the portion except the non-paper passing portion as a fixing member, toner with which the non-paper passing portion of the fixing member relatively increased in hardness comes into contact is squashed to a larger extent than toner with which the portion thereof except the non-paper passing portion having a relatively low hardness comes into contact is, and hence unevenness occurs in the glossiness of the image after the fixation to reduce the quality of an electrophotographic image formed on the full-size paper in some cases.

SUMMARY OF THE INVENTION

In view of the foregoing, one embodiment of the present invention is directed to providing a member for electrophotography in which a hardness difference hardly occurs between a non-paper passing portion and a paper passing portion even when a heat fixing device is operated over a long time period.

Further, another embodiment of the present invention is directed to providing a heat fixing device that fixation unevenness hardly occurs even when toner on full-size paper is fixed in a state in which the device is operated over a long time period.

According to one aspect of the present invention, there is provided a member for electrophotography. The member includes: a substrate; an elastic layer containing a cured silicone rubber having a methyl group bonded to a silicon atom; and a fluorine resin release layer bonded to a surface of the elastic layer by an addition-curing-type silicone rubber adhesive. The elastic layer contains a titanium oxide particle having an anatase-type crystal structure.

According to another aspect of the present invention, there is provided a heat fixing device, which is configured to fix an unfixed toner image formed on a recording medium onto the recording medium through heating and pressurization. The heat fixing device including the member for electrophotography.

Further features of the present invention will become apparent from the following description of exemplary embodiments with reference to the attached drawings.

DESCRIPTION OF THE EMBODIMENTS

Figure 1:
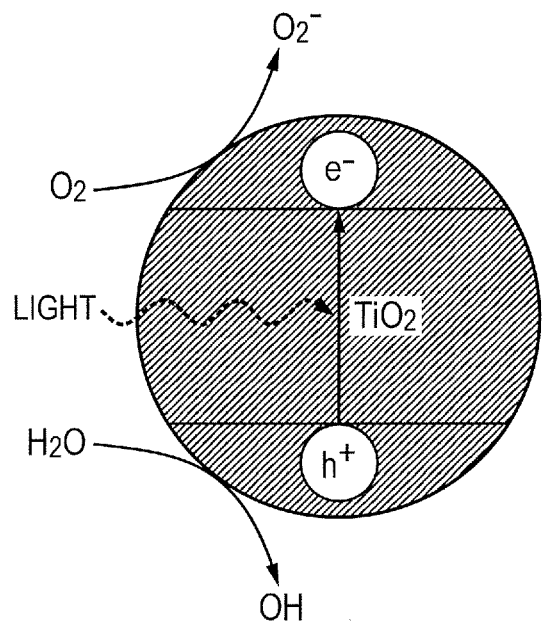
FIG. 1 is a conceptual view of the photocatalytic reaction of titanium oxide.

Preferred embodiments of the present invention will now be described in detail in accordance with the accompanying drawings.

The inventors of the present invention have made studies on causes for an increase in hardness of the non-paper passing portion of such member for electrophotography as described above, and the occurrence of a hardness difference between the non-paper passing portion and paper passing portion thereof. As a result, the inventors have found that a silicone rubber in an elastic layer in the non-paper passing portion is increased in amount of a Si—O bond with respect to a Si—CH$_3$ bond as compared to a silicone rubber in the elastic layer in the paper passing portion. The inventors of the present invention have assumed from the foregoing that the gas permeability of a fluorine resin release layer in the non-paper passing portion is raised by an increase in temperature of the non-paper passing portion to additionally facilitate the arrival of oxygen in the air at the elastic layer, and as a result, the silicone rubber in the elastic layer in the non-paper passing portion is oxidized and cured.

That is, it has been known that such oxidation reaction of a silicone rubber as represented by the following (formula 1) occurs under a high-temperature environment in the air. First, a methyl group bonded to a silicon atom and an oxygen molecule react with each other to form a hydroperoxide. Next, the hydroperoxide is decomposed into a silicon radical, a hydroxy radical, and formaldehyde. Further, the silicon radical and hydroxy radical thus produced are bonded to each other to be transformed into a silanol group, and silicone chains are bonded to each other through a new bond by the dehydration condensation of silanol groups. The hardness of the rubber is considered to increase as a result of the foregoing (NIPPON GOMU KYOKAISHI, 1985, Vol. 58, No. 12).

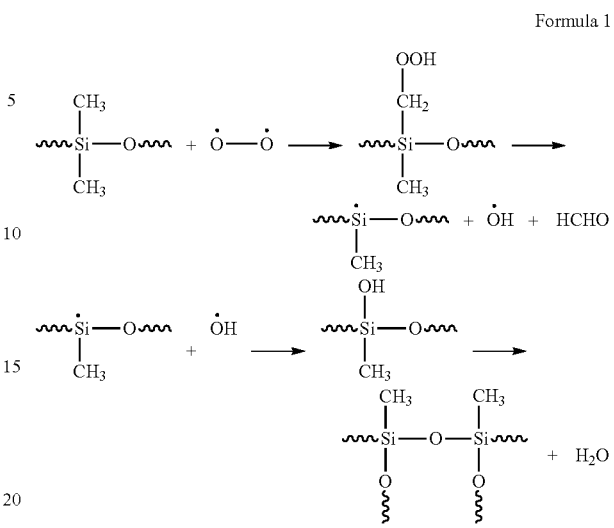

Formula 1

As described above, the inventors of the present invention have assumed that the problems arise from the difference between the amounts of oxygen to be supplied to the elastic layer in the paper passing portion and non-paper passing portion. In view of the foregoing, the inventors have conceived that the suppression of the oxidation of the silicone rubber by oxygen that has reached the elastic layer is effective in solving the problems of the present invention, and have made further studies. As a result, the inventors have found that the incorporation of titanium oxide having an anatase-type crystal structure into the elastic layer is effective.

A member for electrophotography according to one embodiment of the present invention includes: a substrate; an elastic layer containing a cured silicone rubber having a methyl group bonded to a silicon atom; and a fluorine resin release layer bonded to a surface of the elastic layer by an addition-curing-type silicone rubber adhesive. In addition, the elastic layer contains a titanium oxide particle having an anatase-type crystal structure. In addition, a heat fixing device according to the present invention includes a member for electrophotography having the construction.

In the construction of the member for electrophotography, the titanium oxide particle having an anatase-type crystal structure to be incorporated into the elastic layer may be able to capture an oxygen molecule in the elastic layer to suppress the oxidation of a methyl group in the cured silicone rubber.

Three crystal phases, i.e., a rutile type, a brookite type, and an anatase type have each been well known as the crystal structure of titanium oxide. Of those, the anatase type is known to have strong photocatalytic activity.

As illustrated in FIG. 1, when anatase-type titanium oxide is irradiated with light, an electron having negative charge and a hole having positive charge are produced on its surface by its photocatalytic activity. The electron and the hole react with water, oxygen, and the like in air to produce reactive oxygen species such as a hydroxy radical (.OH) and a superoxide anion radical (.$O_2^-$). Of those, the hydroxy radical (.OH) having particularly strong oxidizing power is considered to cleave a bond of an organic substance to perform the oxidative decomposition of the organic substance that is hard to decompose (TECHNO-COSMOS 2001 February, Vol. 14).

However, the inventors have found that in contrast to a conventional common view, titanium oxide having an anatase-type crystal structure (hereinafter sometimes referred to as "anatase-type titanium oxide") suppresses the oxidation of the cured silicone rubber and hence suppresses an increase in its hardness in association with oxidation degradation at the time of its long-term use.

The inventors have performed the following model experiment for the purpose of examining the manner in which the anatase-type titanium oxide exhibits an effect on the oxidation reaction of the silicone rubber.

(Confirmation of Suppressing Effect of Anatase-Type Titanium Oxide on Oxidation of Silicone Rubber)

A silicone rubber composition free of any anatase-type titanium oxide used in Comparative Example 1 and a silicone rubber composition containing anatase-type titanium oxide used in Example 1 to be described later were prepared. Each sample was cured and molded into a sheet shape having a thickness of 500 μm by using a die for a sheet. Further, the sheet was subjected to secondary curing in a heating furnace at 200° C. over 4 hours. Thus, a cured silicone rubber sheet (I) free of any anatase-type titanium oxide and a cured silicone rubber sheet (II) containing the anatase-type titanium oxide were obtained.

In order for the presence of a silicon-oxygen bond (Si—O) as the main chain structure of a cured silicone rubber and a methyl group bonded to a silicon atom (Si—CH$_3$) to be confirmed in an initial state, infrared spectroscopy was performed with an infrared spectrophotometer (FT-IR, trade name: Frontier FT IR, manufactured by PerkinElmer).

Attenuated total reflection (ATR) measurement was performed in a state in which part of the two cured silicone rubber sheets (I) and (II) were squashed with a diamond cell.

The Si—O bond shows strong infrared absorption around a wavenumber of 1,020 cm$^{-1}$ in association with stretching vibration. Further, the Si—CH$_3$ bond shows strong infrared absorption around a wavenumber of 1,260 cm$^{-1}$ in association with bending vibration resulting from its structure. Accordingly, their presence can be confirmed.

The ratio (1,020 cm$^{-1}$/1,260 cm$^{-1}$) of an infrared absorption intensity around 1,020 cm$^{-1}$ resulting from the Si—O bond to an infrared absorption intensity around 1,260 cm$^{-1}$ resulting from the Si—CH$_3$ bond for each of the cured silicone rubber sheets (I) and (II) was defined as $\alpha_0$.

In addition, five samples for a heat resistance test were produced from each of the two cured silicone rubber sheets (I) and (II). A total of 10 rubber pieces cut out of the cured silicone rubber sheets (I) and (II) were each mounted on SUS plate having a thickness of 1 mm, and the each rubber piece together with the SUS plate was sealed with a fluorine resin tube having a thickness of 40 μm (trade name: NSE; manufactured by GUNZE LIMITED). Thus, test samples were obtained.

A heat resistance test was performed by heating the respective test samples in a heating furnace at 240° C., and a change with time was experimented and measured.

One test sample was taken from the heating furnace every 100 hours of the heat resistance test (every time the test samples were heated in the heating furnace at 240° C. for 100 hours), the fluorine resin tube covering the surface of the sample was gently peeled, and attenuated total reflection (ATR) measurement was performed for each of the cured silicone rubber sheets (I) and (II) after the heat resistance test under the same conditions as those of the initial stage (corresponding to 0 hours of the heat resistance test). The ratios (1,020 cm$^{-1}$/1,260 cm$^{-1}$) of the infrared absorption intensity at 1,020 cm$^{-1}$ resulting from the Si—O bond to the infrared absorption intensity at 1,260 cm$^{-1}$ resulting from the Si—CH$_3$ bond for the samples after 100, 200, 300, 400, and 500 hours of the heat resistance test were defined as $\alpha_{100}$, $\alpha_{200}$, $\alpha_{300}$, $\alpha_{400}$, and $\alpha_{500}$, respectively. Table 1 shows the results.

TABLE 1

| Kind | $\alpha_0$ | $\alpha_{100}$ | $\alpha_{200}$ | $\alpha_{300}$ | $\alpha_{400}$ | $\alpha_{500}$ |
|---|---|---|---|---|---|---|
| I | 1.02 | 1.06 | 1.10 | 1.15 | 1.19 | 1.24 |
| II | 1.00 | 1.00 | 1.01 | 1.01 | 1.03 | 1.03 |

The oxidation of the silicone rubber sheet (I) free of any anatase-type titanium oxide particle advanced under the heating environment, and hence the value for $\alpha$ at the time of the long-term heat resistance test increases as compared to the initial value and the amount of the Si—O bond with respect to the Si—CH$_3$ bond in the silicone rubber tends to increase relatively. In other words, it can be confirmed that a methyl group bonded to a silicon atom is oxidized to change into a Si—O—Si bond or a Si—OH bond.

On the other hand, it was revealed that the silicone rubber sheet (II) containing anatase-type titanium oxide particle in its silicone rubber was able to maintain substantially the same infrared absorption intensity ratio ($\alpha$) as the initial value even at the time of the long-term heat resistance test. This means that the oxidation of a methyl group bonded to a silicon atom in the silicone rubber is suppressed.

Although the reason why the effect is expressed has not been completely elucidated, the inventors of the present invention have considered the reason to be as described below: an oxygen molecule that has passed the fluorine resin tube is turned into a superoxide anion radical (.O$_2^-$) having relatively small oxidizing power by the action of the anatase-type titanium oxide particle in the cured silicone rubber, and in association with the turning, the oxygen molecule itself is consumed, and hence a reaction between a methyl group bonded to a silicon atom and the oxygen molecule hardly occurs, and the formation of a hydroperoxide is suppressed. Meanwhile, the elastic layer is used at a high temperature, and hence moisture or the like is substantially absent and the occurrence of a hydroxy radical (.OH) having strong oxidizing power may be suppressed.

Figure 2:
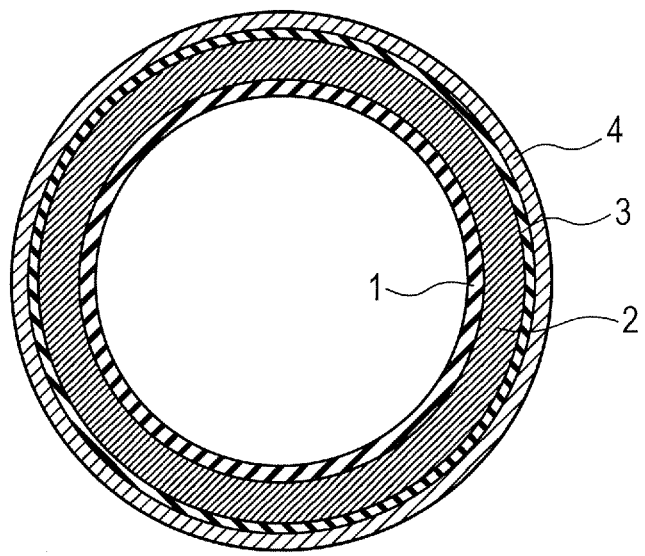
FIG. 2 is a schematic sectional view illustrating a member for electrophotography of a belt form according to the present invention.
Figure 3:
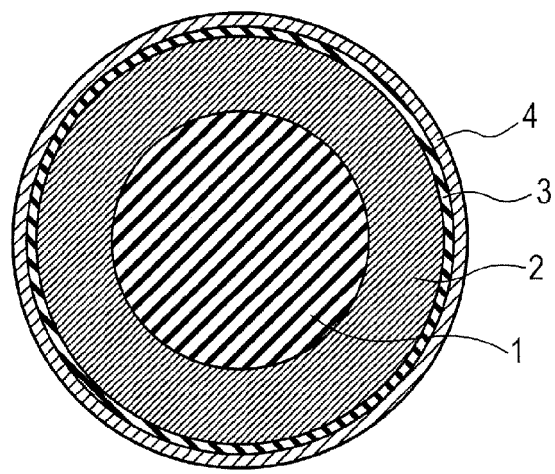
FIG. 3 is a schematic sectional view illustrating a member for electrophotography of a roller form according to one embodiment of the present invention.

FIG. 2 is a schematic sectional view illustrating a member for electrophotography of a belt form as one aspect of the member for electrophotography to be used in the heat fixing device according to the present invention, and FIG. 3 is similarly a schematic sectional view illustrating a member for electrophotography of a roller form. In general, a member for electrophotography is referred to as, for example, "fixing belt" or "pressurizing belt" when the member forms a fixing nip through the deformation of its substrate itself, and the member is referred to as, for example, "fixing roller" or "pressurizing roller" when the substrate itself is substantially free from deforming and the member forms the fixing nip through the elastic deformation of its elastic layer.

In each case, the member for electrophotography includes a substrate 1, an elastic layer 2, an adhesion layer 3, and a release layer 4.

(1) Substrate

A metal or alloy such as aluminum, iron, stainless steel, or nickel, or a heat-resistant resin such as a polyimide is used as a material for the substrate 1. In particular, when the heat fixing device is of an electromagnetic induction heating system, an alloy containing nickel or iron as a main component is used from the viewpoint of heat generation efficiency.

When the member for electrophotography has an endless belt shape, examples of the substrate 1 include an electrocast nickel sleeve, a stainless-steel sleeve, and a heat-resistant resin belt formed of a polyimide. The inner surface of the substrate may be further provided with a layer (not shown) for imparting a function such as wear resistance or heat insulating property.

When the member for electrophotography has a roller shape, a mandrel is used as the substrate 1. A material for the mandrel is, for example, a metal or alloy such as aluminum, iron, or stainless steel. In this case, the inside of the mandrel may be hollow as long as the mandrel has a strength enough to resist pressurization in the fixing device. In addition, when the mandrel is hollow, a heat source, or a core or coil for electromagnetic induction heating can be provided in the mandrel.

The outer surface of the substrate 1 may be subjected to surface treatment for imparting a function such as adhesive property with the elastic layer. Examples of the surface treatment include: physical treatments such as blasting, lapping, and polishing; and chemical treatments such as oxidation treatment, coupling agent treatment, and primer treatment. Two or more kinds of the treatments may be used in combination.

In particular, when a silicone rubber is used as the elastic layer, the primer treatment is generally used as the surface treatment. The primer to be used in this case is in the state of a paint obtained by appropriately blending and dispersing, in an organic solvent, a silane coupling agent, a silicone polymer, a hydrogenated methylsiloxane, an alkoxysilane, an acceleration catalyst for a reaction such as hydrolysis, condensation, or addition, a colorant such as red oxide, or the like, and is commercially available. The primer treatment is performed by applying the primer to the surface of the substrate (adhesive surface with the elastic layer), and subjecting the primer to processes such as drying and calcination.

The primer can be appropriately selected depending on, for example, the material for the substrate, the kind of the elastic layer, and a reaction form at the time of crosslinking. In particular, when the elastic layer contains a large amount of an unsaturated aliphatic group, a primer containing a hydrosilyl group is preferably used as the primer in order that the adhesive property may be imparted by a reaction with the unsaturated aliphatic group. In addition, when the elastic layer contains a large amount of a hydrosilyl group, in contrast, a primer containing an unsaturated aliphatic group is preferably used as the primer. Any other primer except the foregoing such as a primer containing an alkoxy group can be appropriately selected depending on the kinds of the substrate and the elastic layer as an adherends.

(2) Elastic Layer

The elastic layer 2 functions as a layer for causing the member for electrophotography to carry such elasticity that the member does not squash toner at the time of fixation in the heat fixing device and follows the irregularities of the fibers of paper.

In order that such function may be expressed, a silicone rubber cured product (i.e. cured silicone rubber) is used in the elastic layer 2. Of such cured products, a silicone rubber cured product obtained by curing an addition-curing-type silicone rubber composition obtained by mixing, in a liquid addition-curing-type silicone rubber, the anatase-type titanium oxide particle and any other optional component is preferably used.

The liquid addition-curing-type silicone rubber is used because of the following reason. Titanium oxide according to the present invention, a filler as the other optional component, and the like can be easily dispersed in the rubber, and the elasticity of the rubber can be easily adjusted by adjusting its degree of crosslinking depending on the kind and addition amount of the filler to be described later.

In addition, the silicone rubber composition contains titanium oxide particle having an anatase-type crystal structure for the purpose of suppressing the oxidation of a methyl group in a silicone polymer component in the elastic layer after curing to suppress a change in its hardness.

The silicone rubber composition is obtained by further kneading and dispersing a filler suited for each purpose in addition to the foregoing in order that thermal conductivity, heat resistance, electrical conductivity, reinforcing property, or the like may be imparted.

The elastic layer can be formed by: causing the outer peripheral surface of the substrate to carry the silicone rubber composition thus obtained according to a known processing method such as a die molding method, a blade coating method, a nozzle coating method, or a ring coating method; and advancing the crosslinking reaction of the composition according to a method such as heating.

The thickness of the elastic layer can be appropriately designed from the viewpoints of contribution to the surface hardness of the member for electrophotography and the securement of a nip width. When the member for electrophotography has a belt shape, the nip width can be secured by the deformation of the substrate at the time of the incorporation of the member into the heat fixing device. In addition, the belt includes a heat source in itself in many cases. Accordingly, the thickness of the elastic layer falls within the range of preferably from 100 μm or more to 500 μm or less, more preferably from 200 μm or more to 500 μm or less. When the member for electrophotography has a roller shape, it is necessary that the substrate be a rigid body and the nip width be formed by the deformation of the elastic layer. Accordingly, the thickness of the elastic layer falls within the range of preferably from 300 μm or more to 10 mm or less, more preferably from 1 mm or more to 5 mm or less.

(2-1) Liquid Addition-Curing-Type Silicone Rubber

In general, an undiluted solution of the addition-curing-type silicone rubber includes an organopolysiloxane having an unsaturated aliphatic group, an organopolysiloxane having an active hydrogen group bonded to silicon, a platinum compound as a crosslinking catalyst, and a curing controlling agent (inhibiting agent) called an inhibitor.

Examples of the organopolysiloxane having an unsaturated aliphatic group include the following:

a linear organopolysiloxane having one or both of intermediate units selected from the group consisting of an intermediate unit represented by $R^1_2SiO$ and an intermediate unit represented by $R^1R^2SiO$, and a molecular terminal represented by $R^1_2R^2SiO_{1/2}$; and a branched organopolysiloxane having one or both of intermediate units selected from the group consisting of an intermediate unit represented by $R^1SiO_{3/2}$ and an intermediate unit represented by $SiO_{4/2}$, and a molecular terminal represented by $R^1_2R^2SiO_{1/2}$.

In this case, $R^1$ represents a monovalent unsubstituted or substituted hydrocarbon group excluding an unsaturated aliphatic group, bonded to a silicon atom. Specific examples thereof include the following:

an alkyl group (e.g., a methyl group, an ethyl group, a propyl group, a butyl group, a pentyl group, or a hexyl group);

an aryl group (e.g., a phenyl group); and a substituted hydrocarbon group (e.g., a chloromethyl group, a 3-chloropropyl group, a 3,3,3-trifluoropropyl group, a 3-cyanopropyl group, or a 3-methoxypropyl group).

An organopolysiloxane in which a methyl group is bonded to a silicon atom constituting its main chain is suitably used as the organopolysiloxane having an unsaturated aliphatic group because of its ease of production. Examples of such organopolysiloxane include organopolysiloxanes each having a structure in which a methyl group is directly bonded to a silicon atom constituting a siloxane bond as a main chain and an unsaturated aliphatic group is introduced into a side chain or a molecular terminal as represented by the following formula 2 or the following formula 3.

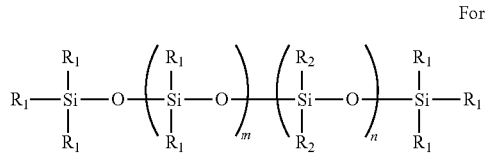

Formula 2

(In the formula 2, m represents an integer of 0 or more and n represents an integer of 3 or more.)

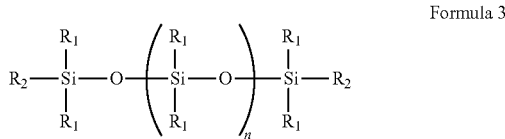

Formula 3

(In the formula 3, n represents a positive integer.)

In the formula 2 and the formula 3, $R_1$ represents a monovalent unsubstituted or substituted hydrocarbon group excluding an unsaturated aliphatic group and including at least a methyl group, bonded to a silicon atom. Specific examples thereof include the following:
  an alkyl group (e.g., a methyl group, an ethyl group, a propyl group, a butyl group, a pentyl group, or a hexyl group);
  an aryl group (e.g., a phenyl group); and
  a substituted hydrocarbon group (e.g., a chloromethyl group, a 3-chloropropyl group, a 3,3,3-trifluoropropyl group, a 3-cyanopropyl group, or a 3-methoxypropyl group).

In particular, 50% or more of $R_1$'s preferably represent methyl groups and all $R_1$'s particularly preferably represent methyl groups because the organopolysiloxane can be easily synthesized and handled.

In addition, $R_2$ represents an unsaturated aliphatic group bonded to a silicon atom. Examples thereof include a vinyl group, an allyl group, a 3-butenyl group, a 4-pentenyl group, and a 5-hexenyl group. Of those, a vinyl group is preferred because the organopolysiloxane can be easily synthesized and handled and is inexpensive and a crosslinking reaction can be easily performed.

The blending of, for example, a titanium oxide crystal or a heat conductive filler increases the viscosity of the addition-curing-type silicone rubber composition. Accordingly, it is important to use an organopolysiloxane having a relatively low viscosity, i.e., a small molecular weight as the organopolysiloxane having an unsaturated aliphatic group.

It is difficult to uniquely identify the molecular weight of the organopolysiloxane because the organopolysiloxane is a polymer compound. However, its construction can be confirmed by using a weight-average molecular weight (Mw) measured by size exclusion chromatography (SEC). Specifically, an organopolysiloxane having a weight-average molecular weight of 150,000 or less is preferred and an organopolysiloxane having a weight-average molecular weight of 70,000 or less is more preferred. The use of an organopolysiloxane having a weight-average molecular weight within the range can suppress an excessive increase in structural viscosity of the addition-curing-type silicone rubber composition.

The organopolysiloxane having an active hydrogen group bonded to silicon is a crosslinking agent for forming a crosslinked structure through a reaction with an alkenyl group of an organopolysiloxane component having an unsaturated aliphatic group based on a catalytic action of the platinum compound. The number of hydrogen atoms bonded to a silicon atom is a number of more than 3 per molecule on average.

An organic group bonded to a silicon atom is exemplified by an unsubstituted or substituted monovalent hydrocarbon group in the same range as that of $R^1$ of the organopolysiloxane component having an unsaturated aliphatic group. In particular, a methyl group is preferred because the organopolysiloxane can be easily synthesized and handled.

The molecular weight of the organopolysiloxane having an active hydrogen group bonded to silicon is not particularly limited. In addition, the viscosity of the organopolysiloxane at 25° C. falls within a range of preferably 10 mm$^2$/s or more to 100,000 mm$^2$/s or less, more preferably 15 mm$^2$/s or more to 1,000 mm$^2$/s or less. The reasons why the viscosity is limited to fall within the range are: that there is no risk that the organopolysiloxane is volatilized during storage to prevent the achievement of a desired degree of crosslinking or physical properties of a formed product; and that the organopolysiloxane can be easily synthesized and handled and can be easily and uniformly dispersed in the system.

Specific examples of such organopolysiloxane include a linear organopolysiloxane represented by the following formula 4 and a cyclic crosslinking agent silicone polymer represented by the following formula 5.

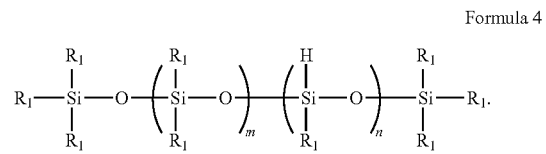

Formula 4

(In the formula 4, m represents an integer of 0 or more and n represents an integer of 3 or more.)

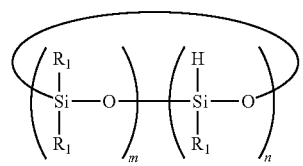

Formula 5

(In the formula 5, m represents an integer of 0 or more and n represents an integer of 3 or more.)

$R_1$ represents a monovalent substituted or unsubstituted hydrocarbon group excluding an unsaturated aliphatic group, bonded to a silicon atom as in $R_1$ described in the foregoing.

In particular, 50% or more of $R_1$'s preferably represent methyl groups and all $R_1$'s particularly preferably represent methyl groups because the organopolysiloxane can be easily synthesized and handled, and excellent heat resistance is obtained.

The presence of the cured silicone rubber derived from the silicone polymer containing a methyl group bonded to a silicon atom in the elastic layer can be confirmed by performing attenuated total reflection (ATR) measurement with an infrared spectrophotometer (FT-IR) (such as a product available under the trade name "Frontier FT IR" from PerkinElmer). A silicon-oxygen bond (Si—O) as the main chain structure of a silicone shows strong infrared absorption around a wavenumber of 1,020 cm$^{-1}$ in association with stretching vibration. Further, a methyl group bonded to a silicon atom (Si—CH$_3$) shows strong infrared absorption around a wavenumber of 1,260 cm$^{-1}$ in association with bending vibration resulting from its structure. Accordingly, the presence can be confirmed.

The content of the cured silicone rubber derived from the organopolysiloxane in the elastic layer can be confirmed by using a thermogravimetric apparatus (TGA) (such as a product available under the trade name "TGA851" from Mettler-Toledo). The elastic layer is cut out with a razor or the like, about 20 mg thereof are accurately weighed, and the resultant sample is loaded into an alumina pan to be used in the apparatus. The alumina pan containing the sample is set in the apparatus, the sample is heated under a nitrogen atmosphere from room temperature to 800° C. at a rate of temperature increase of 20° C./min, and its temperature is maintained at 800° C. for 1 hour. In the nitrogen atmosphere, in association with the temperature increase, the cured silicone rubber component is decomposed and removed by cracking without being oxidized, and hence the weight of the sample reduces. The content of the cured silicone rubber component in the elastic layer can be confirmed by comparing the weights before and after the measurement as described above.

(2-2) Anatase-Type Titanium Oxide Particle

As described in the foregoing, titanium oxide having an anatase-type crystal structure is a constituent component needed for suppressing an increase in hardness of the elastic layer because the titanium oxide suppresses the oxidation of a methyl group bonded to a silicon atom in the silicone polymer.

Titanium oxide shows polymorphism, and three crystal phases, i.e., a rutile type, a brookite type, and an anatase type have been well known. In the present invention, titanium oxide having an anatase-type crystal structure is used.

The crystal structure of titanium oxide can be identified by using an X-ray diffraction measurement (XRD) (such as a product available under the trade name "Ultima IV" from Rigaku Corporation). A diffraction peak characteristic of a plane index (101) as the strongest line of an anatase-type crystal can be confirmed around 2θ=25.3° by setting measurement conditions as follows: a Cu—Kα ray is used as an X-ray source, the ratio of a tube voltage to a tube current is set to 30 kV/20 mA, a scanning range is set to a range of from 10° to 80°, a scanning rate is set to 2.0°/min, a sampling angle is set to 0.01°, and a cumulative number is set to three times.

The volume-average particle diameter of the primary particle of the anatase-type titanium oxide particle to be used in the present invention is preferably 20 nm or more and 40 nm or less. The anatase-type titanium oxide particle having a volume-average particle diameter of 20 nm or more and 40 nm or less hardly causes an increase in viscosity of the silicone rubber composition and hardly reduce processability at the time of the forming of the member for electrophotography. In addition, the particles can suppress an excessive reduction in suppressing effect on the oxidation of the silicone rubber due to an excessive reduction in specific surface area of an anatase-type titanium oxide crystal.

It should be noted that the volume-average particle diameter of the primary particle of the anatase-type titanium oxide particle in the elastic layer is determined with a flow particle image analyzer (trade name: FPIA-3000; manufactured by Sysmex Corporation). Specifically, a sample cut out from the elastic layer is placed in a crucible made of porcelain. The sample is heated to 1,000° C. in a nitrogen atmosphere to decompose and remove a rubber component. Then, the crucible is heated to 1,000° C. under an air atmosphere to burn the vapor grown carbon fibers. Consequently, only the titanium oxide contained in the sample remains in the crucible. The titanium oxide in the crucible is crushed so as to obtain primary particles through use of a mortar and a pestle, and thereafter the primary particles are dispersed in water to prepare a sample liquid. The sample liquid is supplied to the particle image analyzer. In the analyzer, the sample liquid is introduced into and passed through an imaging cell, and the titanium oxide is photographed as a still image.

The diameter of a circle (hereinafter sometimes referred to as "equal area circle") having an area equal to that of a particle image (hereinafter sometimes referred to as "particle projected image") of the titanium oxide projected onto a plane is defined as a diameter of the titanium oxide regarding the particle image. Then, equal area circles of 1,000 titanium oxide particles are determined, and an arithmetic average value thereof is defined as a volume-average particle diameter of the primary particles of titanium oxide.

As to the content of the anatase-type titanium oxide particle in the elastic layer, the anatase-type titanium oxide particle suppresses the oxidation of a methyl group of the cured silicone rubber, and hence the range of the content preferred for the expression of the effect of the present invention is determined in relation to the amount of the cured silicone rubber. That is, the content of the titanium oxide particle with respect to 100 parts by mass of the cured silicone rubber in the elastic layer is preferably 0.5 part by mass or more and 15.0 parts by mass or less, more preferably 0.5 part by mass or more and 12.0 parts by mass or less, particularly preferably 6.0 parts by mass or more and 10.0 parts by mass or less in order that the effect of the present invention may be obtained. Setting the content of the titanium oxide particle within the range enables additionally reliable acquisition of the suppressing effect on the oxidation of the silicone rubber. In addition, the setting can suppress a reduction in processability upon formation of the elastic layer.

(2-3) Filler

The elastic layer 2 may contain a filler except the anatase-type titanium oxide depending on purposes to the extent that the effect of the present invention is not impaired in order that the heat transfer characteristic of the member for electrophotography to be used in the heat fixing device may be improved, and heat insulating property, reinforcing property, heat resistance, processability, electrical conductivity, or the like may be imparted thereto. Particularly for the purpose of improving the heat transfer characteristic, the filler is selected in consideration of, for example, the thermal conductivity, specific heat capacity, density, and particle diameter of the filler itself. Specific examples thereof can include inorganic substances, in particular, a metal and a metal compound. Specific examples of the filler to be used for the purpose of improving the heat transfer characteristic include: silicon carbide; silicon nitride; boron nitride; aluminum nitride; alumina; zinc oxide; magnesium oxide; silica; copper; aluminum; silver; iron; nickel; metal silicon; and carbon fiber.

(2-3) Unsaturated Aliphatic Group in Elastic Layer

It has been known that in the elastic layer formed by using the addition-curing-type silicone rubber composition described in the section (2-1), the so-called rubber aging phenomenon in which the crosslinked structure of the cured silicone rubber is cleaved with time and hence its hardness changes with time occurs. In addition, the aging phenomenon can be effectively suppressed by incorporating an unsaturated aliphatic group such as a vinyl group into the elastic layer. This is probably because of the following reason. Even when the crosslinked structure of the cured silicone rubber is cleaved, the unsaturated aliphatic group in the elastic layer undergoes a radical addition reaction to reconstruct the crosslinked structure, and hence a reduction in elasticity of the elastic layer with time is suppressed.

Therefore, an undiluted solution of the addition-curing-type silicone rubber is preferably blended at such a ratio that the ratio of the number of active hydrogen groups to the number of the unsaturated aliphatic groups becomes 0.3 or more and 0.8 or less. This is because when the ratio is 0.3 or more, a crosslinked structure capable of sufficiently securing elasticity that the elastic layer of a fixing member is required to have can be constructed. This is also because when the ratio is 0.8 or less, the crosslinked structure is constructed by the unsaturated aliphatic group remaining in the elastic layer without reacting at the time of a crosslinking reaction, and hence a reduction in elasticity of the elastic layer can be sufficiently suppressed. The ratio of the number of the active hydrogen groups to the number of the unsaturated aliphatic groups can be determined and calculated by measurement with a hydrogen nuclear magnetic resonance ($^1$H-NMR) (such as a product available under the trade name "AL400 FT-NMR" from JEOL Ltd.). Setting the ratio of the number of the active hydrogen groups to the number of the unsaturated aliphatic groups within the numerical range can stabilize the hardness of the elastic layer.

As described above, the unsaturated aliphatic group is preferably incorporated into the elastic layer for suppressing the change of the elastic layer with time.

In this case, it is difficult to directly observe the amount of the unsaturated aliphatic group in the elastic layer. However, the amount can be indirectly observed by the following method.

First, a plurality of thin pieces each having a predetermined size (e.g., 20 mm×20 mm) are cut out of the elastic layer of the fixing member, and are laminated so as to have a thickness of 2 mm. Then, the type C microhardness of the laminate is measured with a microrubber hardness meter (Microrubber Hardness Meter MD-1 capa Type C; manufactured by KOBUNSHI KEIKI CO., LTD.). A value measured at this time is defined as $H\mu0$.

Next, all the thin pieces of the elastic layer constituting the laminate are completely soaked in a methyl hydrogen silicone oil (trade name: DOW CORNING TORAY SH 1107 FLUID; manufactured by Dow Corning Toray Co., Ltd.). The temperature of the methyl hydrogen silicone oil is maintained at 30° C. and the oil is left to stand for 24 hours (the treatment is hereinafter sometimes referred to as "24-hour soak"). Thus, even the inside of each thin piece is impregnated with the methyl hydrogen silicone oil. Next, all the thin pieces subjected to the 24-hour soak treatment are taken from the methyl hydrogen silicone oil, the oil on their surfaces is sufficiently removed, and the thin pieces are heated in an oven at 200° C. for 4 hours. After that, the thin pieces are cooled to room temperature. Thus, a reaction between the unsaturated aliphatic group and the methyl hydrogen silicone oil as a main reaction is completed for each of all the thin pieces. Next, all the thin pieces are laminated and the microhardness of the resultant laminate is measured with the apparatus. The microhardness at this time is defined as $H\mu1$. Then, a hardness increase ratio (=$H\mu1/H\mu0$) is calculated.

In the case where the amount of the unsaturated aliphatic group in the elastic layer is large, a new crosslinking point is formed in each test piece by the methyl hydrogen silicone oil that has permeated the inside of the test piece. Accordingly, the test piece after the heat treatment shows a significant increase in hardness. In other words, the hardness increase ratio defined by a ratio $H\mu1/H\mu0$ shows a relatively large value.

On the other hand, in the case where the amount of the unsaturated aliphatic group in the elastic layer is small, even when each test piece is impregnated with the methyl hydrogen silicone oil and subjected to the heat treatment, a new crosslinking point is hardly formed. Accordingly, the test piece after the heat treatment shows a slight change in hardness. In other words, the hardness increase ratio shows a relatively small value.

Conditions and the like for the experiment for the calculation of the hardness increase ratio are not limited to those described above as long as the unsaturated aliphatic group in each test piece can be caused to react with reliability.

In the present invention, the hardness increase ratio is preferably 1.5 or more. This is because the unsaturated aliphatic group is present in a relatively abundant manner in the elastic layer and hence a reduction in its elasticity due to aging can be effectively suppressed.

In addition, the hardness increase ratio is preferably 5.0 or less, particularly preferably 4.5 or less in terms of the stability of the crosslinked structure in the elastic layer.

It should be noted that the hardness increase ratio can be specifically controlled by adjusting the composition of the undiluted solution of the addition-curing-type silicone rubber to be used in the formation of the elastic layer.

That is, a ratio between the number of moles of the unsaturated aliphatic group and the number of moles of the active hydrogen group in the undiluted solution of the addition-curing-type silicone rubber is adjusted by adjusting a mixing ratio between the organopolysiloxane having an unsaturated aliphatic group and the organopolysiloxane having an active hydrogen group bonded to a silicon atom in the undiluted solution of the addition-curing-type silicone rubber. Specifically, the amount of the unsaturated aliphatic group present in the elastic layer can be increased by increasing the ratio of the number of moles of the unsaturated aliphatic group to the number of moles of the active hydrogen group. As a result, the hardness increase ratio can be increased.

Incidentally, the presence of a large amount of the unsaturated aliphatic group in the elastic layer is not essential to the present invention. That is, according to the present invention, even when the hardness increase ratio ($H\mu1/H\mu0$) of the elastic layer does not fall within the range of from 1.5 or more to 5.0 or less, the effect according to the present invention, that is, the effect by which the enlargement of a hardness difference between a non-paper passing portion and a paper passing portion can be suppressed is exhibited.

More specifically, even in the case of a member for electrophotography having such an elastic layer having a small unsaturated aliphatic group content that the hardness increase ratio is 1.0 or more and less than 1.5, i.e. the hardness increase ratio of 1.0 is inclusive, and the hardness increase ratio of 1.5 is not inclusive in the range, the effect according to one embodiment of the present invention is obtained by causing the anatase-type titanium oxide particle to exist in the elastic layer.

(3) Adhesion Layer

The adhesion layer 3 is a layer produced by bonding the elastic layer and the release layer through an addition-curing-type silicone rubber adhesive. An addition-curing-type silicone rubber blended with a self-adhesive component is preferably used as the adhesive. Specifically, the adhesive contains an organopolysiloxane having a plurality of unsaturated aliphatic groups typified by a vinyl group in its molecular chain, a hydrogen organopolysiloxane, and a platinum compound as a crosslinking catalyst. In addition, the adhesive cures through an addition reaction. A known adhesive can be used as such adhesive.

Examples of the self-adhesive component include:

a silane having at least one kind of functional group, preferably two or more kinds of functional groups selected from the group consisting of an alkenyl group such as a vinyl group, a (meth)acryloxy group, a hydrosilyl group (SiH group), an epoxy group, an alkoxysilyl group, a carbonyl group, and a phenyl group;

an organic silicon compound such as a cyclic or linear siloxane having 2 or more and 30 or less silicon atoms, preferably 4 or more and 20 or less silicon atoms;

a non-silicon-based organic compound (i.e., containing no silicon atom in the molecule) that: contains, in one molecule, 1 or more and 4 or less, preferably 1 or more and 2 or less aromatic rings such as mono- or higher valent and tetra- or lower valent, preferably di- or higher valent and tetra- or lower valent phenylene structures; contains, in one molecule, at least one, preferably 2 or more and 4 or less functional groups capable of contributing to a hydrosilylation addition reaction (such as an alkenyl group and a (meth)acryloxy group); and may contain an oxygen atom.

One kind of the self-adhesive components may be used alone, or two or more kinds thereof may be used in combination.

A filler component can be added to the adhesive from the viewpoints of the adjustment of its viscosity and the securement of its heat resistance to the extent that the addition does not deviate from the gist of the present invention.

Examples of the filler component include the following:

silica, alumina, iron oxide, cerium oxide, cerium hydroxide, and carbon black.

Such addition-curing-type silicone rubber adhesive is commercially available and hence can be easily obtained.

The thickness of the adhesion layer is preferably 20 µm or less. When the thickness of the adhesion layer is set to 20 µm or less, thermal resistance upon use of the member for electrophotography in the heat fixing device can be set to a small value, and hence heat from the inner surface side of the member for electrophotography can be efficiently transferred to a recording medium.

(4) Fluorine Resin Release Layer

The fluorine resin release layer 4 is formed of a fluorine resin, and for example, a product obtained by molding any one of the resins listed below into a tubular shape is used.

A tetrafluoroethylene-perfluoro(alkyl vinyl ether) copolymer (PFA), polytetrafluoroethylene (PTFE), a tetrafluoroethylene-hexafluoropropylene copolymer (FEP), and the like.

Of the resins listed above, PFA is preferred from the viewpoints of moldability and toner release property.

The thickness of the fluorine resin release layer is preferably set to 10 µm or more and 50 µm or less. This is because wear resistance can be secured while the elasticity of the elastic layer as a lower layer upon lamination of the release layer is maintained and an excessive increase in surface hardness of the member for electrophotography (fixing member) is suppressed.

The adhesive property of the inner surface of the fluorine resin tube can be improved by performing, for example, sodium treatment, excimer laser treatment, or ammonia treatment in advance.

Figure 4:
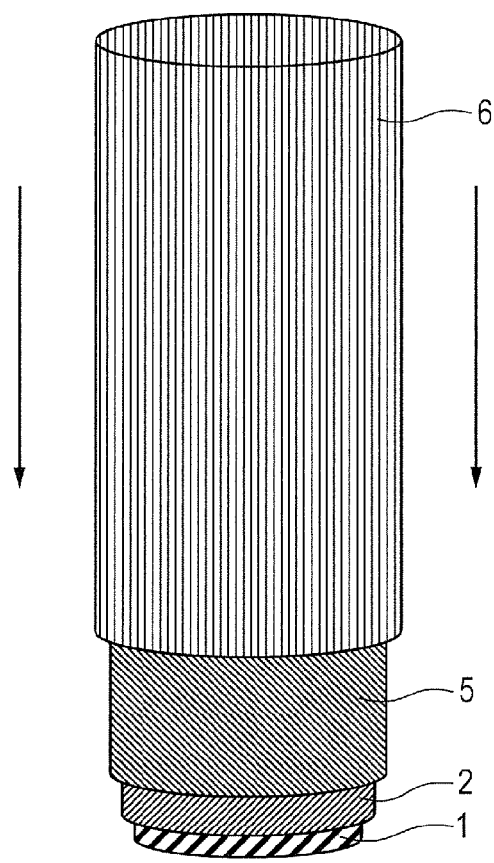
FIG. 4 is a schematic view of an example of a step of laminating a fluorine resin release layer.

FIG. 4 is a schematic view of an example of a step of laminating the fluorine resin release layer 4 on the elastic layer 2 through the addition-curing-type silicone rubber adhesive.

An addition-curing-type silicone rubber adhesive 5 is applied to the surface of the elastic layer 2 formed on the outer peripheral surface of the substrate 1. The outer surface of the adhesive is further covered with a fluorine resin tube 6 as the fluorine resin release layer 4 so that the tube may be laminated on the outer surface.

Although a method for the covering is not particularly limited, for example, a method involving covering the outer surface through the use of the addition-curing-type silicone rubber adhesive as a lubricant, or a method involving expanding the fluorine resin tube from its outside to cover the outer surface can be employed.

The redundant addition-curing-type silicone rubber adhesive remaining between the elastic layer and the fluorine resin release layer is removed by being squeezed out with a unit (not shown). The thickness of the adhesion layer after the squeezing is preferably set to 20 µm or less from the viewpoint of heat transfer property.

Next, the addition-curing-type silicone rubber adhesive 5 is cured and bonded by being heated with a heating unit such as an electric furnace for a predetermined time period, and both end portions of the resultant are each cut into a desired length. Thus, the member for electrophotography according to the present invention can be obtained.

(5) Heat Fixing Device

A heat fixing device according to the present invention includes a pair of heated rotating members like a roller and a roller, a film and a roller, a belt and a roller, or a belt and a belt brought into pressure contact with each other, and is appropriately selected in consideration of conditions such as a process speed and a size as the entire electrophotographic image forming apparatus to which the heat fixing device is mounted.

In the heat fixing device, a fixing member and a pressurizing member as heated members for electrophotography are brought into press contact with each other to form a fixing nip N, and a recording medium S serving as a body to be heated, the recording medium having formed thereon images with unfixed toner t, is interposed and conveyed into the fixing nip N. Thus, the toner images are heated and pressurized. As a result, the toner images are melted and subjected to color mixing. After that, the toner images are cooled, whereby the toner images are fixed onto the recording medium.

Now, the construction of a heat fixing device of an electromagnetic induction heating system as a specific example of the heat fixing device is described, but the scope and applications of the present invention are not limited thereto.

Figure 5:
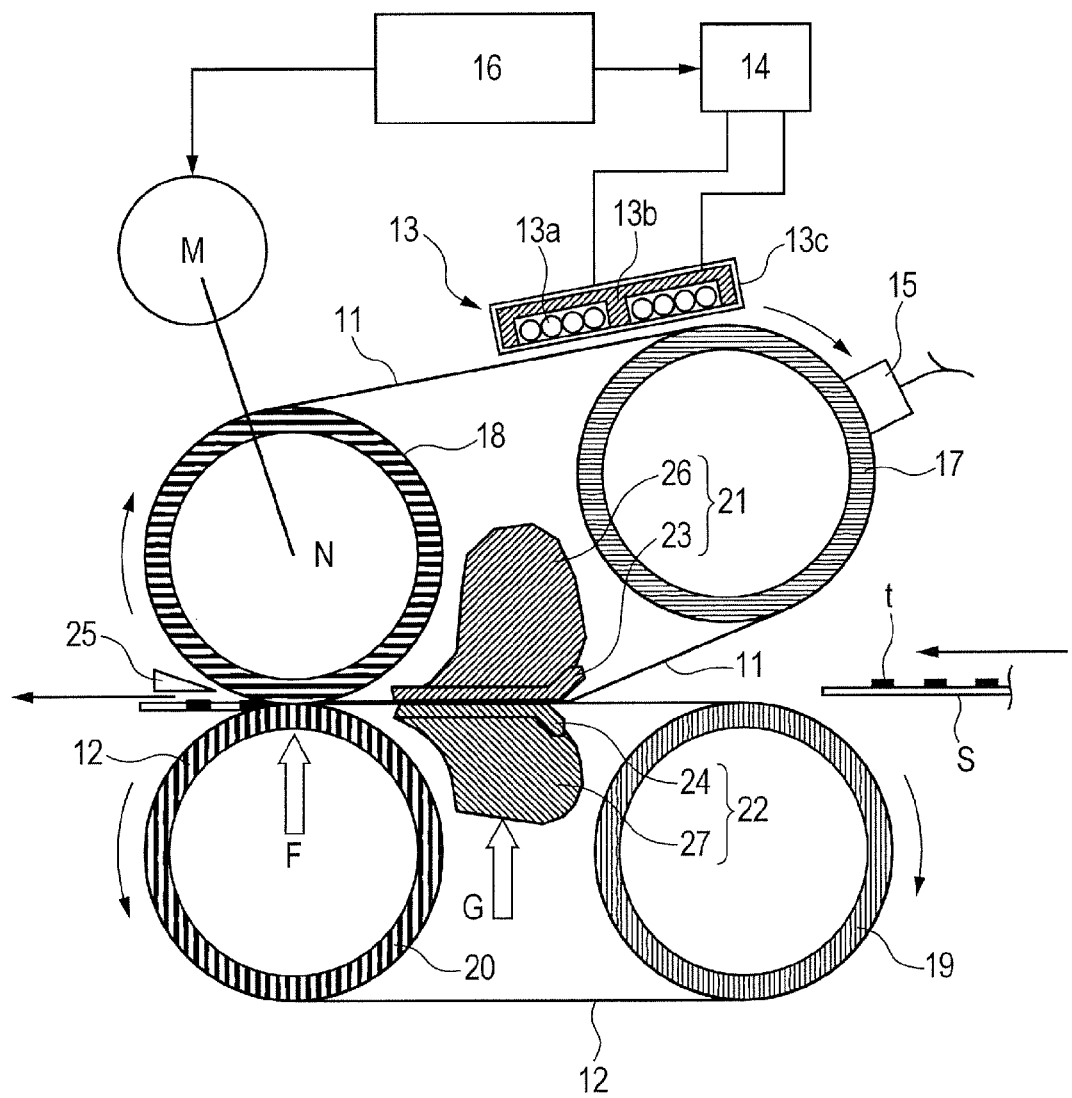
FIG. 5 is a schematic cross-sectional view of an example of a heat fixing device according to one embodiment of the present invention.

FIG. 5 is a schematic cross-sectional view of an example of a heat fixing device of the so-called twin-belt system in which a pair of heated rotating members like a fixing belt 11 and a pressurizing belt 12 is brought into press contact, the heat fixing device including the member for electrophotography according to the present invention as the fixing belt.

It should be noted that the term "longitudinal" or "longitudinal direction" as used herein for the heat fixing device or a member constituting the device refers to the substrate axis direction of the fixing belt 11, the direction being perpendicular to the paper surface. The front surface of the heat fixing device is a surface on a side in which the recording medium S is introduced. The terms "left" and "right" refer to the left and right when the device is viewed from the front surface, respectively. The width of a belt is a belt dimension in the substrate axis direction of the belt (=dimension in the longitudinal direction of the belt). In addition, the width of the recording medium is the dimension of the recording medium in the longitudinal direction in the surface of the recording medium. In addition, the terms "upstream" and "downstream" refer to upstream and downstream with respect to the direction in which the recording medium is conveyed, respectively.

The heat fixing device includes the fixing belt as the member for electrophotography according to the present invention and the pressurizing belt 12.

A heat source of an electromagnetic induction heating system (an induction heating member or an exciting coil) having high energy efficiency is adopted as a unit for heating the fixing belt 11. The induction heating member 13 includes an induction coil 13a, an exciting core 13b, and a coil holder 13c for holding the coil and the core. The induction coil 13a uses a Litz wire flatly wound in an elliptical shape and is placed in the horizontal E-shaped exciting core 13b protruding toward the center and both sides of the induction coil. A material having a high magnetic permeability and a low residual magnetic flux density such as a ferrite or a permalloy is used as a material for the exciting core 13b, and hence a loss in the induction coil 13a or the exciting core 13b can be suppressed and the fixing belt 11 can be efficiently heated.

When a high-frequency current is flowed from an exciting circuit 14 to the induction coil 13a of the induction heating member 13, the substrate of the fixing belt 11 causes induction heat generation and hence the fixing belt 11 is heated. The temperature of the surface of the fixing belt 11 is detected by a temperature detector element 15 such as a thermistor. A signal concerning the temperature of the fixing belt 11 detected by the temperature detector element 15 is input into a control circuit portion 16. The control circuit portion 16 controls electric power supplied from the exciting circuit to the induction coil 13a so that temperature information input from the temperature detector element 15 may be maintained at a predetermined fixation temperature, thereby controlling the temperature of the fixing belt 11 to the predetermined fixation temperature.

The fixing belt 11 is tensioned by a roller 17 and a fixation side roller 18 as belt suspension members. The roller 17 and the fixation side roller 18 are rotatably supported with bearings between the left and right side plates (not shown) of the device.

The roller 17 is a hollow roller made of iron having an outer diameter of 20 mm, an inner diameter of 18 mm, and a thickness of 1 mm, and functions as a tension roller for providing the fixing belt 11 with tension.

The fixation side roller 18 is a highly slidable elastic roller obtained by providing a mandrel made of an iron alloy having an outer diameter of 20 mm and a diameter of 18 mm with a silicone rubber layer as an elastic layer. A driving force is input from a driving source (motor) M into the fixation side roller 18 as a drive roller through a drive gear train (not shown), and hence the roller is rotationally driven in a clockwise direction indicated by the arrow at a predetermined speed. When the fixation side roller 18 is provided with the elastic layer as described above, the driving force input into the fixation side roller 18 can be satisfactorily transferred to the fixing belt 11, and a fixing nip for securing the separability of the recording medium from the fixing belt 11 can be formed. The elastic layer exhibits a shortening effect on a warm-up time because the layer reduces the conduction of heat into the roller.

When the fixation side roller 18 is rotationally driven, the fixing belt 11 rotates together with the fixation side roller 18 by virtue of friction between the silicone rubber surface of the fixation side roller 18 and the inner surface of the fixing belt 11. The inner diameter of the fixing belt is 55 mm.

The pressurizing belt 12 is tensioned by a tension roller 19 and a pressurization side roller 20 as belt suspension members. The inner diameter of the pressurizing belt is 55 mm. The tension roller 19 and the pressurization side roller 20 are rotatably supported with bearings between the left and right side plates (not shown) of the device.

The tension roller 19 is obtained by providing a mandrel made of an iron alloy having an outer diameter of 20 mm and a diameter of 16 mm with a silicone sponge layer for reducing a thermal conductivity to reduce the conduction of heat from the pressurizing belt 12.

The pressurization side roller 20 is a lowly slidable rigid roller made of an iron alloy having an outer diameter of 20 mm, an inner diameter of 16 mm, and a thickness of 2 mm.

Here, in order that the fixing nip N may be formed between the fixing belt 11 and the pressurizing belt 12, both the left and right end sides of the rotation axis of the pressurization side roller 20 are pressurized toward the fixation side roller 18 with a predetermined pressurizing force in a direction indicated by the arrow F by a pressurizing mechanism (not shown).

In addition, the following pressurizing pads are adopted for obtaining the wide fixing nip N without increasing the size of the device: a fixing pad 21 as a first pressurizing pad for pressurizing the fixing belt 11 toward the pressurizing belt 12; and a pressurizing pad 22 as a second pressurizing pad for pressurizing the pressurizing belt 12 toward the fixing belt 11. The fixing pad 21 and the pressurizing pad 22 are supported and placed between the left and right side plates (not shown) of the device. The pressurizing pad 22 is pressurized toward the fixing pad 21 with a predetermined pressurizing force in a direction indicated by the arrow G by a pressurizing mechanism (not shown). The fixing pad 21 as the first pressurizing pad includes a pad substrate 26 and a sliding sheet (low friction sheet) 23 in contact with the fixing belt. The pressurizing pad 22 as the second pressurizing pad also includes a pad substrate 27 and a sliding sheet 24 in contact with the pressurizing belt. This is because there is a problem in that the shaving of a portion of the pad that rubs against the inner peripheral surface of the belt increases. When the sliding sheet 23 or 24 is interposed between the belt and the pad substrate, the shaving of the pad can be prevented and the sliding resistance can be reduced, and hence good belt traveling property and good belt durability can be secured.

It should be noted that the fixing belt is provided with a non-contact antistatic brush (not shown) and the pressurizing belt is provided with a contact antistatic brush.

The control circuit portion 16 drives the motor M at least at the time of the performance of image formation. Thus, the fixation side roller 18 is rotationally driven and the fixing belt 11 is rotationally driven in the same direction. The pressurizing belt 12 rotates following the fixing belt 11. Here, the most downstream portion of the fixing nip has such a construction that the recording medium is conveyed while the fixing belt 11 and the pressurizing belt 12 are sandwiched between the fixation side roller 18 and the pressurization side roller 20 that form a pair, and hence the belts can be prevented from slipping. The most downstream portion of the fixing nip is a portion in which a pressure distribution in the fixing nip (in the direction in which the recording medium is conveyed) becomes maximum.

In a state in which the temperature of the fixing belt 11 is increased and controlled to the predetermined fixation temperature, the recording medium S having the unfixed toner images t is conveyed into the fixing nip N between the fixing belt 11 and the pressurizing belt 12. The recording medium S is introduced with its surface bearing the unfixed toner images t directed toward the fixing belt 11. Then, the unfixed toner images t of the recording medium S are interposed and conveyed while closely adhering to the outer peripheral surface of the fixing belt 11. Thus, heat is applied from the fixing belt to the images and the images receive a pressurizing force to be fixed onto the surface of the recording medium S. After that, the recording medium S is separated from the fixing belt by a separating member 25 and conveyed.

Figure 6:
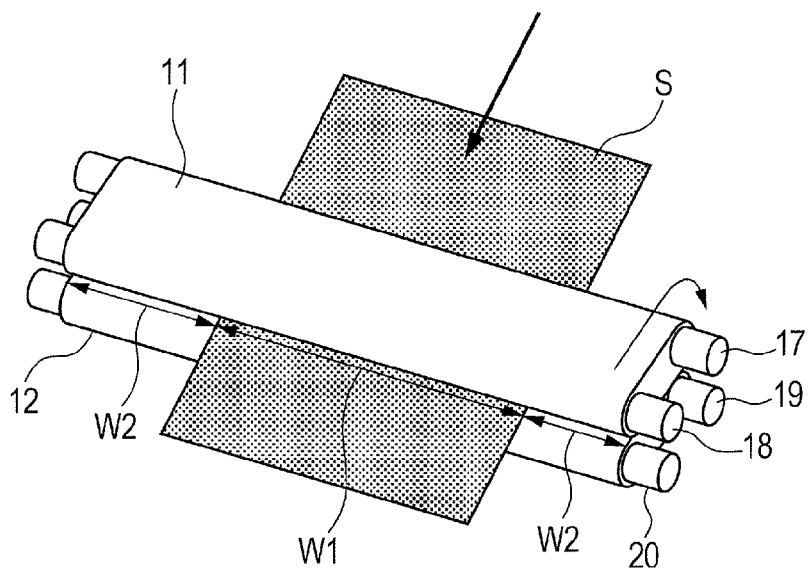
FIG. 6 is a perspective view illustrating the outline of a state in which a recording medium is conveyed.
Figure 7:
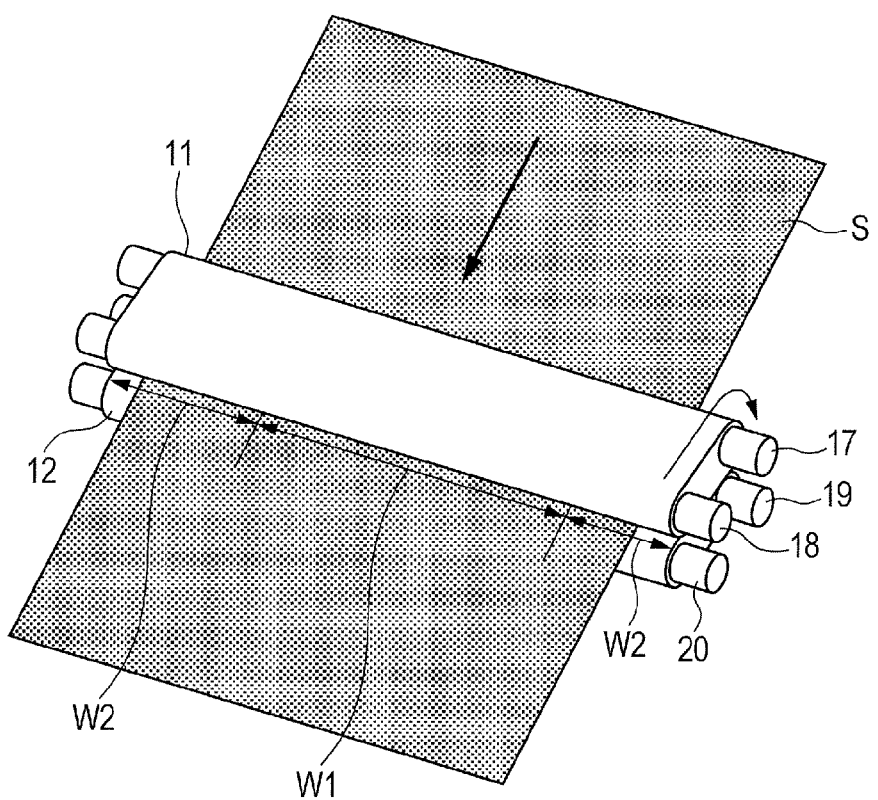
FIG. 7 is a perspective view illustrating the outline of the state in which the recording medium is conveyed.

FIG. 6 and FIG. 7 are each a perspective view illustrating the outline of a state in which the recording medium is conveyed in the heat fixing device illustrated in FIG. 5. Several constituent members illustrated in FIG. 5 are omitted.

FIG. 6 illustrates a heat fixation state when a recording medium having a narrow size in the longitudinal direction of the heat fixing device (small-size paper) is used as the recording medium. When the recording medium S is conveyed and introduced from a front direction into the heat fixing device, heat is stolen from the fixing belt 11 and the pressurizing belt 12 in a portion corresponding to the longitudinal direction width W1 of the recording medium. On the other hand, heat is not stolen from the fixing belt 11 and the pressurizing belt 12 in a portion corresponding to the longitudinal direction width W2 as a non-paper passing region where the recording medium does not pass. Accordingly, in the W2 portion, the fixing belt 11 and the pressurizing belt 12 are relatively exposed to high temperature.

When many recording media are passed in a state in which a temperature distribution occurs in the longitudinal direction in the heat fixing device as described above, a large difference in hardness of the elastic layer of the member for electrophotography may occur between the width of the fixing belt 11 corresponding to the W1 and the width thereof corresponding to the W2. However, adopting the construction disclosed in the present invention can suppress the hardness difference to a minimum.

The suppressing effect on the hardness difference can be confirmed when, for example, a recording medium having a wide size in the longitudinal direction of the heat fixing device (such as full-size paper) is passed as illustrated in FIG. 7. In the case where the member for electrophotography in which the hardness difference occurs is used, when the full-size paper is passed after images have been fixed onto many sheets of the small-size paper, a difference in glossiness occurs between the portion of an image fixed onto the full-size paper corresponding to the longitudinal direction width W1 of the small-size paper and the portion thereof corresponding to the W2. That is, gloss uniformity in the full-size paper is impaired. In the construction disclosed in the present invention, however, the gloss uniformity can be secured even in the full-size paper because substantially no change in hardness of the member for electrophotography occurs even in the portion corresponding to the longitudinal direction width W2.

As described above, according to the present invention, there can be obtained such a member for electrophotography that the oxidation of a silicone rubber in an elastic layer due to an increase in temperature of a non-paper passing portion region upon long-term use of a heat fixing device is suppressed, and hence the occurrence of a difference in glossy feeling of an electrophotographic image in association with a hardness difference between a paper passing portion and the non-paper passing portion when toner is fixed onto a large recording medium such as full-size paper can be suppressed. In addition, according to the present invention, there can be obtained a heat fixing device capable of stably forming a high-quality electrophotographic image.

EXAMPLES

The present invention is described hereinafter more specifically by way of Examples.

Example 1

(1) Production of Fixing Belt

First, a silicone rubber composition to be used as a material for an elastic layer was prepared.

70 Parts by mass of a silicone polymer (weight-average molecular weight: 28,000) represented by the structural formula of the formula 2 (in the formula 2, $R_1$ represented a methyl group and $R_2$ represented a vinyl group) having introduced into a side chain portion thereof a vinyl group in an amount of 1.2 mol % with respect to a silicon atom were prepared as a methyl group-containing silicone polymer having an unsaturated aliphatic group on a side chain thereof (hereinafter sometimes referred to as "first silicone polymer").

Next, 27 parts by mass of a silicone polymer (weight-average molecular weight: 28,000) represented by the structural formula of the formula 3 (in the formula 3, $R_1$ represented a methyl group and $R_2$ represented a vinyl group) having introduced into a terminal portion thereof a vinyl group were prepared as a methyl group-containing silicone polymer having an unsaturated aliphatic group at a terminal thereof (hereinafter sometimes referred to as "second silicone polymer").

Further, 3 parts by mass of a methyl group-containing silicone polymer (weight-average molecular weight: 2,000) represented by the structural formula of the formula 4 (in the formula 4, $R_1$ represented a methyl group) having introduced thereinto a hydrosilyl group in an amount of 19.5 mol % with respect to a silicon atom were prepared as a crosslinking agent silicone polymer (hereinafter sometimes referred to as "third silicone polymer").

Then, the first to third silicone polymers were sufficiently mixed with one another to provide 100 parts by mass of a silicone polymer as a base polymer. The base polymer has a ratio, i.e. molar ratio, of the number of active hydrogen groups to the number of the unsaturated aliphatic group of 0.6. Hereinafter, the ratio is defined as "H/Vi".

8.0 Parts by mass of anatase A (trade name: Titanium(IV) Oxide Anatase Form 208-18231, manufactured by Wako Pure Chemical Industries, Ltd., volume-average particle diameter: 30 nm) as the titanium oxide particle having an anatase-type crystal structure and 400 parts by mass of alumina (trade name: ALUNABEADS CB-A09S, manufactured by Showa Denko K.K., average particle diameter: 9 μm) as a heat conductive filler were added to 100 parts by mass of the base polymer. Further, trace amounts of a hydrosilylation catalyst (platinum catalyst: platinum carbonylcyclovinylmethylsiloxane complex) and an inhibitor (methylvinyltetrasiloxane) were added to the mixture, and the whole was sufficiently kneaded. Thus, the silicone rubber composition was obtained.

Next, a nickel electrocast endless sleeve having an inner diameter of 55 mm, a length of 420 mm, and a thickness of 65 μm was prepared as a substrate. It should be noted that in a series of production steps, the endless sleeve was handled while a core was inserted into the sleeve.

A primer (trade name: DY39-051A/B; manufactured by Dow Corning Toray Co., Ltd.) was applied to the outer peripheral surface of the substrate in a substantially uniform manner so that its dry weight became 30 mg. After the solvent had been dried, baking treatment was performed in an electric furnace set to 160° C. for 30 minutes.

The silicone rubber composition was applied onto the substrate subjected to the primer treatment by a ring coating method so as to have a thickness of 450 μm. The silicone rubber was cured by heating the resultant endless belt in an electric furnace set to 200° C. for 4 hours. Thus, an elastic layer having a thickness of 450 μm was obtained.

An addition-curing-type silicone rubber adhesive (trade name: SE1819CV A/B; manufactured by Dow Corning Toray Co., Ltd.) was applied as an adhesion layer to the surface of the elastic layer of the endless belt in a substantially uniform manner so as to have a thickness of about 20 μm, and a fluorine resin tube having an inner diameter of 52 mm and a thickness of 40 μm (trade name: NSE; manufactured by GUNZE LIMITED) was laminated as a release layer while its diameter was expanded.

After that, the redundant adhesive was squeezed out of a space between the elastic layer and the fluorine resin tube by uniformly squeezing the surface of the belt from above the fluorine resin tube so that the thickness of the adhesive became as small as about 5 μm.

The fluorine resin tube was fixed onto the elastic layer by heating the endless belt in an electric furnace set to 200° C. for 1 hour to cure the adhesive. Both end portions of the resultant endless belt were cut. Thus, a fixing belt having a width of 368 mm was obtained.

(2) Confirmation of Content of Unsaturated Aliphatic Group in Elastic Layer

Calculation of Hardness Increase Ratio

An interface between the substrate and elastic layer of the fixing belt obtained in the section (1), and an interface between the adhesion layer and elastic layer thereof were cut with a razor blade. Thus, the substrate, the adhesion layer, and the fluorine resin tube were removed from the fixing belt. A plurality of 20-mm square rubber pieces were cut out of the elastic layer.

Next, the rubber pieces were laminated so as to have a thickness of 2 mm, and the microhardness (Hμ0) of the laminate was measured with a type C microhardness meter (trade name: Microrubber Hardness Meter MD-1 capa Type C; manufactured by KOBUNSHI KEIKI CO., LTD.). The measured value was 62.9°.

A beaker containing 50 mL of a methyl hydrogen silicone oil (trade name: DOW CORNING TORAY SH 1107 FLUID; manufactured by Dow Corning Toray Co., Ltd.) was prepared. All the rubber pieces constituting the laminate were loaded into the beaker, and were soaked in the oil so that the entirety of each rubber piece was soaked therein. Then, the temperature of the oil in the beaker was maintained at 30° C. with a water bath set to a temperature of 30° C., and the oil was left to stand for 24 hours. After that, the rubber pieces were taken from the methyl hydrogen silicone oil, and the oil on the surface of each rubber piece was sufficiently wiped off with a wiper (trade name: KIMWIPE S-200; manufactured by NIPPON PAPER CRECIA CO., LTD.). Then, the respective rubber pieces were placed in an oven set to 200° C. and heated for 4 hours, and were then cooled to room temperature. The respective rubber pieces were taken from the oven and laminated again, and the microhardness (Hμ1) of the laminate was measured in the same manner as in the foregoing. The measured value was 88.1°.

Accordingly, the hardness increase ratio (Hμ1/Hμ0) of the elastic layer of the fixing belt according to Example 1 was 1.4.

(3) Evaluation of Fixing Belt

A new fixing belt was produced by the method described in the section (1).

The fixing belt was mounted on the heat fixing device of an electrophotographic copying machine (trade name: imageRUNNER ADVANCE C7065, manufactured by Canon Inc.) and a printing test was performed.

A method for the test was as follows: a change in glossy feeling of an output image in association with the passing of small-size paper was evaluated. With regard to the timing at which the evaluation was performed, an image was printed on full-size paper at each of an initial stage, the time of the passing of 300,000 sheets of the small-size paper, and the time of the passing of 600,000 sheets of the small-size paper, and the image was evaluated for its glossy feeling.

A4 size paper (trade name: Highly White Paper GF-C081, basis weight: 81 $g/m^2$; manufactured by Canon Inc.) was used as the small-size paper, and the paper was passed while the paper was set so that the paper was longitudinally fed (its short side was parallel to the longitudinal direction of the fixing belt).

The image to be evaluated for its glossy feeling was obtained by printing a cyan toner and a magenta toner on substantially the entire surface of coated paper having a size of 330 mm×483 mm (trade name: OK Top Coat+, basis weight: 128 $g/m^2$; manufactured by Oji Paper Co., Ltd.) at densities of 100% each. The resultant image was defined as an image for an evaluation, and a difference in glossy feeling between a portion corresponding to the longitudinal direction width W1 of the small-size paper and a portion corresponding to the W2 was evaluated by five subjects.

Criteria for the results of the evaluation are as described below.

Rank A: Four or more of the five subjects judged that there was no difference in glossy feeling.
Rank B: Three of the five subjects judged that there was no difference in glossy feeling.
Rank C: Three of the five subjects judged that there was a difference in glossy feeling.
Rank D: Four or more of the five subjects judged that there was a difference in glossy feeling.

As a result of the evaluation, the fixing belt was evaluated as the rank A in the evaluation at each of the timings, i.e., the initial stage, after the passing of the 300,000 sheets, and after the passing of the 600,000 sheets. Table 4 shows the results of the evaluation.

In addition, the hardness of the fixing belt was measured at a timing immediately after the printing of the image for an evaluation. The hardness was measured with a microrubber hardness meter (manufactured by KOBUNSHI KEIKI CO., LTD., trade name: Microrubber Hardness Meter MD-1 capa Type C) in a state in which a core having substantially the same outer diameter as the inner diameter of the fixing belt was inserted into the belt so as to suppress a change in shape of the belt. With regard to measurement sites, the arithmetic average of values measured at 8 sites in the peripheral direction of a central portion (corresponding to the paper passing portion of the small-size paper) in the longitudinal direction of the fixing belt was defined as the hardness of the central portion, and the arithmetic average of values measured at 8 sites in the peripheral direction of a position distant by 40 mm from each of both end portions of the fixing belt (corresponding to the non-paper passing portion of the small-size paper)

toward the central portion was defined as the hardness of the end portion. Table 4 shows the results of the measurement as well.

Examples 2 to 9 and Comparative Examples 1 to 3

Fixing belts were each produced by the same procedure as that of Example 1 except that the kind and amount of titanium oxide were changed as shown in Table 3, and the belts were each subjected to the same printing test and the same evaluation for a gloss difference. In Comparative Example 1, a fixing belt was produced without the addition of titanium oxide. Table 4 shows the results.

It should be noted that in Examples 2 to 9, and Comparative Examples 2 and 3, the following respective titanium oxide particles were used.

Examples 2 to 5: anatase A (trade name: Titanium(IV) Oxide Anatase Form 208-18231; manufactured by Wako Pure Chemical Industries, Ltd., volume-average particle diameter: 30 nm)

Example 6: anatase B (trade name: Photocatalytic Titanium Oxide AMT-100; manufactured by TAYCA CORPORATION, volume-average particle diameter: 6 nm)

Example 7: anatase C (trade name: Photocatalytic Titanium Oxide Powder ST-21; manufactured by ISHIHARA SANGYO KAISHA, LTD., volume-average particle diameter: 20 nm) Example 8: anatase D (trade name: Ultrafine Titanium Oxide STT-65C-S; manufactured by Titan Kogyo, Ltd., volume-average particle diameter: 40 nm)

Example 9: anatase E (trade name: Jupiter S F-1502; manufactured by Showa Denko K.K., volume-average particle diameter: 90 nm) Comparative Examples 2 and 3: rutile F (trade name: Titanium(IV) Oxide Rutile Form 203-09413; manufactured by Wako Pure Chemical Industries, Ltd., volume-average particle diameter: 30 nm)

Example 10

A silicone rubber composition to be used as a material for an elastic layer was prepared.

71 parts by mass of a silicone polymer (weight-average molecular weight: 28,000) represented by the structural formula of the formula 2 (in the formula 2, $R_1$ represented a methyl group and $R_2$ represented a vinyl group) having introduced into a side chain portion thereof a vinyl group in an amount of 1.2 mol % with respect to a silicon atom were prepared as the first silicone polymer.

Next, 27 parts by mass of a silicone polymer (weight-average molecular weight: 28,000) represented by the structural formula of the formula 3 (in the formula 3, $R_1$ represented a methyl group and $R_2$ represented a vinyl group) having introduced into a terminal portion thereof a vinyl group were prepared as the second silicone polymer.

Further, 2 parts by mass of a methyl group-containing silicone polymer (weight-average molecular weight: 2,000) represented by the structural formula of the formula 4 (in the formula 4, $R_1$ represented a methyl group) having introduced thereinto a hydrosilyl group in an amount of 19.5 mol % with respect to a silicon atom were prepared as the third silicone polymer. The polymers were sufficiently mixed with one another to provide 100 parts by mass of a silicone polymer as a base polymer. The base polymer has a ratio H/Vi of 0.4.

15.0 Parts by mass of anatase A (trade name: Titanium(IV) Oxide Anatase Form 208-18231, manufactured by Wako Pure Chemical Industries, Ltd., volume-average particle diameter: 30 nm) as the titanium oxide particle having an anatase-type crystal structure and 400 parts by mass of alumina (trade name: ALUNABEADS CB-A09S, manufactured by Showa Denko K.K., average particle diameter: 9 μm) as a heat conductive filler were added to 100 parts by mass of the base polymer. Further, trace amounts of a hydrosilylation catalyst (platinum catalyst: platinum carbonylcyclovinylmethylsiloxane complex) and an inhibitor (methylvinyltetrasiloxane) were added to the mixture, and the whole was sufficiently kneaded. Thus, the silicone rubber composition was obtained.

A fixing belt according to this example was produced in the same manner as in Example 1 except that the silicone rubber composition thus prepared was used.

The hardness increase ratio of the elastic layer of the resultant fixing belt was calculated based on the section (2) of Example 1, and the belt was evaluated based on the section (3) of Example 1.

Examples 11 and 12

Silicone rubber compositions according to Example 11 and Example 12 were each prepared in the same manner as in the silicone rubber composition according to Example 10 except that the amounts of the first to third silicone polymers in Example 10 were changed as shown in Table 2 below. The ratios H/Vi of the respective base polymers according to Example 11 and 12 are shown in Table 2.

Then, fixing belts according to Examples 11 and 12 were prepared in the same manner as in Example 1 except that those silicone rubber compositions were used.

The hardness increase ratios of the elastic layers of the resultant fixing belts were calculated based on the section (2) of Example 1, and the belts were evaluated based on the section (3) of Example 1.

TABLE 2

|  | First silicone polymer | Second silicone polymer | Third silicone polymer | H/Vi |
|---|---|---|---|---|
| Example 11 | 69 | 27 | 4 | 0.8 |
| Example 12 | 68 | 26 | 6 | 1.3 |

Comparative Example 4

A silicone rubber composition was prepared in the same manner as in the silicone rubber composition according to Example 10 except that no anatase-type titanium oxide was added. A fixing belt according to Comparative Example 4 was prepared in the same manner as in Example 10 except that the silicone rubber composition was used.

The hardness increase ratio of the elastic layer of the resultant fixing belt was calculated based on the section (2) of Example 1, and the belt was evaluated based on the section (3) of Example 1.

Comparative Example 5

A silicone rubber composition was prepared in the same manner as in the silicone rubber composition according to Example 12 except that no anatase-type titanium oxide was added. A fixing belt according to Comparative Example 5 was prepared in the same manner as in Example 12 except that the silicone rubber composition was used.

The hardness increase ratio of the elastic layer of the resultant fixing belt was calculated based on the section (2) of Example 1, and the belt was evaluated based on the section (3) of Example 1.

Table 3 shows the outline of the composition of each of the elastic layers of the fixing belts according to Examples 1 to 12 and Comparative Examples 1 to 5, and the hardness increase ratios of the elastic layers. In addition, Table 4 shows the results of the evaluations of the fixing belts according to Examples and Comparative Examples.

TABLE 3

| | Silicone polymer | Anatase-type titanium oxide particle | | | Hardness |
| | Addition amount (part(s) by mass) | Kind | Particle diameter (nm) | Addition amount (part(s) by mass) | increase ratio (Hμ1/Hμ0) |
|---|---|---|---|---|---|
| Example 1 | 100 | Anatase A | 30 | 8.0 | 1.4 |
| Example 2 | 100 | Anatase A | 30 | 6.0 | 1.4 |
| Example 3 | 100 | Anatase A | 30 | 10.0 | 1.4 |
| Example 4 | 100 | Anatase A | 30 | 0.5 | 1.4 |
| Example 5 | 100 | Anatase A | 30 | 12.0 | 1.4 |
| Example 6 | 100 | Anatase B | 6 | 0.5 | 1.4 |
| Example 7 | 100 | Anatase C | 20 | 8.0 | 1.4 |
| Example 8 | 100 | Anatase D | 40 | 8.0 | 1.4 |
| Example 9 | 100 | Anatase E | 90 | 12.0 | 1.4 |
| Comparative Example 1 | 100 | — | — | — | 1.4 |
| Comparative Example 2 | 100 | Rutile F | 30 | 8.0 | 1.4 |
| Comparative Example 3 | 100 | Rutile F | 30 | 12.0 | 1.4 |
| Example 10 | 100 | Anatase A | 30 | 15.0 | 1.5 |
| Example 11 | 100 | Anatase A | 30 | 15.0 | 1.2 |
| Example 12 | 100 | Anatase A | 30 | 15.0 | 1.0 |
| Comparative Example 4 | 100 | — | — | — | 1.5 |
| Comparative Example 5 | 100 | — | — | — | 1.0 |

TABLE 4

| | Number of endurance sheets | | | | | | | | | | | |
| | Initial stage | | | | 300,000 sheets | | | | 600,000 sheets | | | |
| | Central portion hardness | End portion hardness | Hardness difference | Gloss difference | Central portion hardness | End portion hardness | Hardness difference | Gloss difference | Central portion hardness | End portion hardness | Hardness difference | Gloss difference |
|---|---|---|---|---|---|---|---|---|---|---|---|---|
| Example 1 | 84 | 84 | 0 | A | 84 | 84 | 0 | A | 84 | 84 | 0 | A |
| Example 2 | 83 | 83 | 0 | A | 83 | 83 | 0 | A | 83 | 84 | 1 | A |
| Example 3 | 85 | 85 | 0 | A | 85 | 85 | 0 | A | 85 | 85 | 0 | A |
| Example 4 | 82 | 82 | 0 | A | 82 | 83 | 1 | A | 82 | 84 | 2 | B |
| Example 5 | 86 | 86 | 0 | A | 86 | 86 | 0 | A | 86 | 86 | 0 | A |
| Example 6 | 81 | 81 | 0 | A | 81 | 82 | 1 | A | 81 | 83 | 2 | B |
| Example 7 | 85 | 85 | 0 | A | 85 | 85 | 0 | A | 85 | 85 | 0 | A |
| Example 8 | 84 | 84 | 0 | A | 84 | 84 | 0 | A | 84 | 85 | 1 | A |
| Example 9 | 87 | 87 | 0 | A | 87 | 88 | 1 | A | 87 | 89 | 2 | B |
| Comparative Example 1 | 81 | 81 | 0 | A | 82 | 85 | 3 | C | 83 | 89 | 6 | D |
| Comparative Example 2 | 84 | 84 | 0 | A | 84 | 86 | 2 | B | 85 | 90 | 5 | D |
| Comparative Example 3 | 85 | 85 | 0 | A | 85 | 87 | 2 | B | 86 | 90 | 4 | D |
| Example 10 | 85 | 85 | 0 | A | 85 | 85 | 0 | A | 85 | 85 | 0 | A |
| Example 11 | 86 | 86 | 0 | A | 86 | 86 | 0 | A | 86 | 86 | 0 | A |
| Example 12 | 88 | 88 | 0 | A | 88 | 88 | 0 | A | 88 | 88 | 0 | A |
| Comparative Example 4 | 85 | 85 | 0 | A | 85 | 88 | 3 | B | 85 | 91 | 6 | C |
| Comparative Example 5 | 88 | 88 | 0 | A | 88 | 91 | 3 | B | 88 | 94 | 6 | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-012584, filed Jan. 27, 2014, which is hereby incorporated by reference herein in its entirety.

What is claimed is:

1. A member for electrophotography, comprising:
 a substrate;
 an elastic layer containing a cured silicone rubber having a methyl group bonded to a silicon atom; and
 a fluorine resin release layer bonded to a surface of the elastic layer by an addition-curing-type silicone rubber adhesive,
 wherein the elastic layer contains a titanium oxide particle having an anatase-type crystal structure, wherein a volume-average particle diameter of primary particles of the titanium oxide particle is from 20 nm to 40 nm, and wherein the volume-average particle diameter is obtained from a sample cut out from the elastic layer.

2. The member for electrophotography according to claim 1, wherein a content of the titanium oxide particle with respect to 100 parts by mass of the cured silicone rubber in the elastic layer is from 0.5 part by mass to 12.0 parts by mass.

3. The member for electrophotography according to claim 2, wherein the content of the titanium oxide particle is from 6.0 parts by mass to 10.0 parts by mass.

4. The member for electrophotography according to claim 1, wherein the elastic layer has a hardness increase ratio defined by $H\mu1/H\mu0$ of 1.0 to less than 1.5, where Hp denotes a microhardness of a sample cut out of the elastic layer, and H0 denotes a microhardness of a rubber obtained by soaking the sample in a methyl hydrogen silicone oil for 24 hours, and then further curing the sample.

5. The member for electrophotography according to claim 1, wherein:

the member for electrophotography has a belt shape in which the elastic layer is formed on an outer peripheral surface of an endless belt-shaped substrate; and the elastic layer has a thickness of 100 μm to 500 μm.

6. The member for electrophotography according to claim 5, wherein the elastic layer has a thickness of 200 μm to 500 μm.

7. The member for electrophotography according to claim 1, wherein:

the member for electrophotography has a roller shape in which the elastic layer is formed on a peripheral surface of a mandrel as the substrate; and the elastic layer has a thickness of 300 μm to 10 mm.

8. The member for electrophotography according to claim 7, wherein the thickness of the elastic layer is from 1 mm to 5 mm.

9. The member for electrophotography according to claim 1, wherein the fluorine resin release layer contains a compound selected from the group consisting of a tetrafluoroethylene-perfluoro(alkyl vinyl ether) copolymer, polytetrafluoroethylene, and a tetrafluoroethylene-hexafluoropropylene copolymer.

10. A heat fixing device, which is configured to fix an unfixed toner image formed on a recording medium onto the recording medium through heating and pressurization, wherein, the heat fixing device comprises a member for electrophotography comprising:

a substrate;

an elastic layer containing a cured silicone rubber having a methyl group bonded to a silicon atom; and a fluorine resin release layer bonded to a surface of the elastic layer by an addition-curing-type silicone rubber adhesive, wherein the elastic layer contains a titanium oxide particle having an anatase-type crystal structure, wherein a volume-average particle diameter of primary particles of the titanium oxide particle is from 20 nm to 40 nm, and wherein the volume-average particle diameter is obtained from a sample cut out from the elastic layer.

* * * * *